United States Patent
Di Bartolo

(10) Patent No.: US 12,550,910 B2
(45) Date of Patent: Feb. 17, 2026

(54) SEMI-FINISHED POWDERY FOOD PRODUCT BASED ON VEGETABLE FOOD AND A PROCESS FOR PRODUCTION THEREOF

(71) Applicant: DI BARTOLO SRL, Calatabiano (IT)

(72) Inventor: Rosario Di Bartolo, Calatabiano (IT)

(73) Assignee: DI BARTOLO SRL, Calatabiano (IT)

( * ) Notice: Subject to any disclaimer, the term of this patent is extended or adjusted under 35 U.S.C. 154(b) by 576 days.

(21) Appl. No.: 17/761,762

(22) PCT Filed: Sep. 21, 2020

(86) PCT No.: PCT/IB2020/058773
§ 371 (c)(1),
(2) Date: Mar. 18, 2022

(87) PCT Pub. No.: WO2021/053638
PCT Pub. Date: Mar. 25, 2021

(65) Prior Publication Data
US 2023/0345957 A1    Nov. 2, 2023

(30) Foreign Application Priority Data
Sep. 20, 2019  (IT) ................... 102019000016880

(51) Int. Cl.
| | | |
|---|---|---|
| *A23C 11/10* | (2025.01) | |
| *A21D 10/00* | (2006.01) | |
| *A23L 29/30* | (2016.01) | |
| *A23P 10/40* | (2016.01) | |

(52) U.S. Cl.
CPC .......... *A23C 11/103* (2013.01); *A21D 10/005* (2013.01); *A23L 29/35* (2016.08); *A23P 10/40* (2016.08)

(58) Field of Classification Search
CPC ........ A23C 11/103; A23L 29/35; A23P 10/40; A21D 10/005
USPC ........................................................ 426/629
See application file for complete search history.

(56) References Cited

U.S. PATENT DOCUMENTS

| | | |
|---|---|---|
| 5,762,994 A | 6/1998 | Juillerat et al. |
| 2005/0100650 A1 | 5/2005 | Lepagnol et al. |
| 2014/0227420 A1 | 8/2014 | Lahtinen et al. |
| 2016/0324204 A1* | 11/2016 | Lu ........................... A23L 33/40 |

FOREIGN PATENT DOCUMENTS

ES        2 040 654        10/1993

OTHER PUBLICATIONS

International Search Report for PCT/IB2020/058773, mailed Jan. 14, 2021, 3 pages.
Written Opinion of the ISA for PCT/IB2020/058773, mailed Jan. 14, 2021, 7 pages.
Database GNPD [Online] 1-13 MINTEL; Sep. 8, 2016 (Sep. 8, 2016), anonymous: 11 Original Almond Milk with Calcium, XP055701938, retrieved from www.gnpd.com, Database accession No. 4272117, whole document.
Database GNPD [Online] 1-13, MINTEL; May 23, 2013 (May 23, 2013), anonymous: 11 Organic Almond Milk Powder, XP055701937, retrieved from www.gnpd.com, Database accession No. 2078079, whole document.

* cited by examiner

*Primary Examiner* — Brent T O'Hern
(74) *Attorney, Agent, or Firm* — NIXON & VANDERHYE

(57) ABSTRACT

Disclosed is a powder and dehydrated product essentially including, or consisting of, a food of plant origin with a lipid content of at least 30% by weight, and a water-soluble bulking agent. Also disclosed is a process for preparing this powder product.

7 Claims, No Drawings

SEMI-FINISHED POWDERY FOOD PRODUCT BASED ON VEGETABLE FOOD AND A PROCESS FOR PRODUCTION THEREOF

This application is the U.S. national phase of International Application No. PCT/IB2020/058773 filed Sep. 21, 2020 which designated the U.S. and claims priority to IT 102019000016880 filed Sep. 20, 2019, the entire contents of each of which are hereby incorporated by reference.

BACKGROUND OF THE INVENTION

Field of the Invention

The present invention relates to a product deriving from the processing of whole foods of plant origin with a high lipid content, such as oleaginous fruits, in particular the fruits of the almond, such as the variety *Prunus dulcis*. More in particular, the product according to the present invention is a food product mainly intended for human consumption, typically after being further transformed. Even more in particular, this product is a dehydrated food product P in fine powder form.

Description of the Related Art

The field of application of this product is typically that of the production of finished food products, whether in liquid, cream or paste, or also solid, form, typically by food artisans and industries. More in particular, the product according to the present invention can be used mainly as base compound for preparing milk substitute plant based beverages or as a base for ice cream, puddings, bakery products, creams, sauces and other products usually prepared with cow's milk.

In recent years there has been increasing interest for plant milks as substitutes of milk, in particular cow's milk, such as almond or coconut milk or rice or soya based beverages, as alternatives to traditional cow's milk. This interest has arisen to meet a plurality of consumers' need, for example the demand for food preparations obtained with raw materials other than milk and cheese products, both in view of the fact that the latter have components that cause many allergies and intolerances and due to ethical and health-related choices by consumers who prefer the nutritional properties of plant based milk substitutes, more pleasing and also considered healthy due to the absence of components such as lactose and cholesterol and as an important source of mono- and polyunsaturated fatty acids, as well as proteins, fibers, vitamins and minerals.

Currently, peanuts, soya, almonds, rice and hazelnuts are the main raw materials of plant origin that can be used to obtain alternative beverages to cow's milk.

Among said raw materials of plant origin, almonds are used to produce well-known almond milk, a beverage with organoleptic and sensorial properties that make it very similar in taste to cow's milk with respect to beverages obtained with the aforesaid raw materials of plant origin other than almonds. Moreover, almond milk differs from the aforesaid beverages as it has a relatively neutral flavor. For example, soya, which is the most well known and widely used plant milk, has the disadvantage that it still has a marked flavor and odor of pulses, while rice milk is more watery and less dense, unlike almond milk which is creamier and has a density similar to cow's milk. Milks obtained with the other raw plant materials mentioned above have even more marked flavors of the raw plant materials used (such as coconut, pea, etc.).

These plant based beverages, including almond milk, are colloidal systems comprising, among other things, water, a lipid fraction and a protein fraction, starch granules and fibers deriving from the raw material used.

Currently, almond milk is obtained by dissolving 100% pure almond paste in water and, to allow complete dissolution of the almond paste, which due to its lipid content is not instantly water-soluble, the mixture is subjected to a homogenization process.

Moreover, almond paste is not stable during the storage period: its shelf life is limited, following the occurrence of phenomena of the lipid fraction, present in relatively large amounts in the paste, rising to the surface; mainly for this reason the almond paste must be stored at temperatures below 10° C. Beverages obtained with this paste also suffer from problems.

Said products are emulsions and therefore the main problem that occurs is caused by their limited stability over time, i.e., mainly during their storage period. In fact, phenomena of sedimentation or rising to the surface can occur during storage, with an evident loss of quality of the beverage. Consequently, the shelf life of these beverages is somewhat limited.

To overcome this problem and hence increase the stability of the beverage over time, it is possible, for example, to resort to a homogenization process and/or to the addition of preservatives, in particular such as emulsion stabilizers, for example lecithin and hydrocolloids such as agar, to the beverage.

Moreover, the usually low density liquid form of these products, requires the handling and storage of large volumes. This causes a sizeable problem from the point of view of product management costs.

SUMMARY OF THE INVENTION

The present invention aims, among other things, to overcome the aforesaid problems. A new dehydrated product P, of vegan type, in particular based on a whole food of plant origin with a high lipid content, which does not have the aforesaid problems, has now surprisingly been found. This product is a semi-finished product, in fine powder form, which can be used as base preparation for the artisan or industrial preparation of finished products.

Said food product P has a high stability in time, so as to maintain a high level of quality both of its organoleptic and its nutritional properties; therefore, it can also be stored for long periods of time, substantially longer with respect to those of the aforesaid beverages or of almond paste, without resorting to particular treatments to extend its shelf life. Moreover, advantageously the product of the present invention has the property, significant for the purpose of its marketing, of being stable at room temperature. Therefore, the product is easier and less expensive to store as, for example, it does not require the use of refrigerated systems and, having smaller volumes with respect to the liquid product, it occupies less space, also for this reason reducing the management costs, in particular for transport and storage.

A further advantage of the product of the present invention is that of being provided at least with high water solubility/dispersibility, which enables its rehydration and solubilization/dispersion simply by adding water to said product and subsequently stirring the mixture obtained, and thus its rapid transformation into a milk-substitute liquid food, which can be used as a replacement of cow's milk or other milk, only at the time of its effective use.

Moreover, the powder form of the product makes the product practical to handle and also easy to dose.

A further advantage of this product is its versatility, which allows it to be used to prepare a wide variety of finished products, as regards consistency and taste, in particular when the product is based on almonds. In fact, as mentioned above, the product according to the present invention can be used as a milk substitute base compound to prepare both sweet and savory finished products, as specified above.

Therefore, the present invention relates to a semi-finished food product P in powder form comprising a food of plant origin chosen from oleaginous fruits with a lipid content of at least 30% by weight. More in particular, said food product P substantially comprises, or preferably consists of, the following components:
  a) a food of plant origin (a) chosen from at least one fruit belonging to the group of oleaginous fruits having a lipid content of at least 30% by weight, and
  b) a vegetable bulking agent.

Said components (a) and (b) are in a ratio by weight that varies from 1:1, preferably 1:1.2, to 1:7.

Said food product P is partly dehydrated, i.e., has a moisture content equal to or lower than 10% by weight, preferably equal to or lower than 8%, more preferably equal to or lower than 6%, with respect to the total weight of the product P.

Typically, in said food product P, the food of plant origin (a) has a moisture content equal to or lower than 10% by weight.

Within the scope of the present invention, the expression "oleaginous fruits" means those plant products with a high lipid content, these fruits are commonly known and classified as "tree nuts" and/or "dry fruit". The most common examples of oleaginous fruits that can be used are cashew nuts, peanuts, sweet or bitter almonds, hazelnuts, pine nuts, pistachios, various types of walnuts, such as the walnut produced by the common walnut of the species *Juglans regia L.*, Brazil nuts, coconuts, Macadamia nuts, pecan nuts, etc. Oleaginous fruits in their common sense (i.e., almond, pine nut, walnut, etc.) are in actual fact, from a botanical point of view, a seed. Therefore, the edible part is the seed.

According to a preferred embodiment, the component (a) is selected from those foods such as hazelnuts, pistachios, pine nuts and almonds, even better those with a mild flavor, such as pine nuts, and, even more preferably, almonds or a mixture of said nuts.

Therefore, in the present description, the term "food" means both a homogeneous whole, i.e., a single type of oleaginous fruit, albeit possibly of different varieties, and a heterogeneous whole, i.e. a mixture of two or more of said oleaginous fruits, in any ratio by weight, with one another. Therefore, the component (a) can be a mixture of oleaginous fruits. In this case, the mixture preferably comprises a larger amount of almonds with respect to the amounts of other oleaginous fruits.

In the present description, all references to the oleaginous fruit, and to the whole food, is meant as only the edible part thereof.

Oleaginous fruits are thus named due to the high lipid content in their edible part. In general, for the purposes of the present invention, oleaginous fruits containing lipids in an amount of at least 30%, preferably 35%, more preferably 40%, even more preferably at least 45%, by weight, with respect to the total weight of the whole food of plant origin, are preferred. Indicatively, oleaginous fruits have a lipid content of up to 76% by weight with respect to the total weight of the whole food of plant origin.

In these oleaginous fruits the lipids present are, as is well known to those skilled in the art, prevalently triglycerides of medium or long chain fatty acids, both saturated and, mainly, monounsaturated and polyunsaturated. Generally, from the point of view of quality, these fruits are rich in monounsaturated fatty acids (prevalently oleic acid) and a non-negligible amount of polyunsaturated fatty acids, in particular with unsaturation in position ω-6. In particular, said polyunsaturated fatty acid is linoleic acid.

In the food product P according to the present invention, the oleaginous fruit that forms the food of plant origin (a) can be in one of the following forms:
  raw, the fruit being in non-dehydrated or dehydrated form or a mixture of said forms; or
  roasted.

Naturally, the food product P can also comprise the oleaginous fruits in both said forms (i.e., raw or roasted), the fruits in said form being in any ratio by weight to one another.

Roasting of said oleaginous fruits is a method of cooking that gives the fruit a particular aroma, which is also detected in the food product P.

Moreover, this roasting allows the moisture content in the fruit to be reduced, typically the content of water by weight is reduced by half or even more.

In the food product P according to the present invention the oleaginous fruits in roasted form are, preferably, almonds, hazelnuts, pine nuts, pistachios, cashew nuts.

Said food product P comprises the food of plant origin (a) that derives from the corresponding whole food of plant origin (i).

In the present description, the term "whole" means a food freshly picked as it is found in nature, i.e. a food in which the nutritional properties in its composition have not been artificially modified following transformations of its composition after it is picked.

The food of plant origin (a) is different with respect to the corresponding whole food of plant origin (i) from which it derives as the food of plant origin (a) is in paste form. Another possible difference concerns the water content; in fact, the food of plant origin (a) can have a lower water content compared to the corresponding whole food of plant origin (i) from which it derives, when the whole food of plant origin (i) is subjected to dehydration before its transformation into paste. In this case, said food of plant origin (a) has a moisture content equal to or lower than 30%, preferably equal to or lower than 15% more preferably equal to or lower than 10%, by weight.

In addition to the aforesaid differences, the food of plant origin (a) can if necessary further differ from the corresponding whole food of plant origin (i) in its chemical composition if it is in roasted rather than raw form.

Therefore, the food of plant origin (a) present in the food product P according to the present invention is a food whose only possible food transformation process or treatment is said cooking (roasting).

Therefore, the food of plant origin (a) is a food that has not been subjected to an intense manipulation process to modify its qualitative and/or quantitative composition with reference in particular to its macronutrients, i.e. nutrients belonging to the class of lipids, proteins and carbohydrates, and also micronutrients, such as vitamins Consequently, the food of plant origin (a) is not an enriched food (as in the case of the addition of a vitamin, mineral salts) or a food modified in order to obtain a desired qualitative and/or quantitative profile of a macronutrient (fats or other), therefore different with respect to the corresponding whole food; based on the type of manipulation, the manipulated food would, for example, have a lower fat content, and/or have added polyunsaturated fatty acids, or be enriched with proteins, etc., and manipulated food would have a different nutrient composition with respect to the corresponding original, i.e., whole, food.

In other words, the food of plant origin (a) is a food that, in relation to its composition, has possibly been subjected only to a physical mutation, determined by dehydration or said roasting.

Said vegetable bulking agent can be solubilized in water preferably by at least 70%, preferably 75%, more preferably 95%, of its weight, i.e., has a solubility in water preferably of at least 95% at a temperature of between 8 and 30° C.

Said vegetable bulking agent is preferably selected from the following components:
  starches, such as wheat starch, and starch derivatives, such as maltodextrins and glucose syrup;
  sugars, such as glucose, fructose, sucrose;
  gums, such as gum arabic;
  plant fibers, such as inulin, fibers derived from wheat, corn, rice, almond;
  plant proteins, such as proteins from pulses (lupines, soya, chickpeas, peas), rice proteins and corn proteins;
  natural or modified celluloses, such as hydroxypropyl methyl cellulose; and
  extracted or synthetic hydrocolloids, such as carrageenans.

The vegetable bulking agents preferred are maltodextrins.

More preferably, in the product P according to the present invention, said components (a) and (b) are present in the following amounts (percentages by weight):
  from 13 to 45%, more preferably from 15 to 45%, typically from 20 to 35%, of component (a), and
  from 55 to 87%, more preferably from 55 to 85%, typically from 65 to 80%, of component (b).

As stated, the product P essentially comprises or, preferably, consists only of, said components (a) and (b).

If further components other than components (a) and (b) are present, said further components are contained in the product P, in an amount equal to or lower than 10%, preferably 5%, more preferably 2%, even more preferably 1% by weight with respect to the total weight of the food product P.

As mentioned above, said food product P is substantially formed only of said components (a) and (b), therefore this product P is not enriched with isolated nutritional substances, such as proteins, sweet tasting sugars (as is or, for example, in syrup form), fats, vitamins, etc., or with food additives, such as flavorings, colorings, antioxidants, stabilizers, etc. Maltodextrins are particularly suitable as bulking agent due to the fact that they have a substantially neutral flavor, i.e., they are tasteless.

Any type of maltodextrin can be used in the present invention; however, maltodextrins having a dextrose equivalent content typically of between 10 and 20, preferably between 12 and 20, more preferably between 15 and 20, are more preferable.

For example, a type of maltodextrin that can be used in the product according to the present invention has the following properties:
  apparent density (poured bulk density) of between 400 and 600 g/l,
  particle size: larger than 250 µm in an amount no greater than 10%, and smaller than 40 µm in an amount below 50%.

The food product P has a lipid content indicatively of between 2.5 and 20%, preferably 5-18%, more preferably 7-16%, by weight with respect to the weight of the whole product P.

It can be noted that the product P according to the present invention is a plant food derivative, therefore meaning that this product P does not contain any food of animal origin, for example obtain directly by milking animals, i.e., typically cow's milk, or products of its transformation, such as milk powder, cheese, yoghurt, etc.

As mentioned above, the product P according to the present invention is in powder form, preferably a very fine powder. Indicatively, the powder can have a grain size of between 80 and 250 µm, preferably 80 and 200 µm, more preferably 80 and 180 µm, size determined using a digital micrometer.

Moreover, the product P according to the present invention has a powder density typically of between 300 and 500 g/l, preferably between 350 and 400 g/l, determined by weighing a known volume.

The product P according to the present invention has a light coloring, for example from light beige to almost white, depending on the initial food used.

Moreover, the product P according to the present invention has a delicate flavor or subtle hint of flavor.

White or substantially white products with a very delicate flavor are preferred.

Therefore, the present invention also relates to the use of said product P for the purpose of preparing a finished food product, i.e., ready for consumption. In fact, the product P according to the present invention is typically a semi-finished product. More in particular, the product P according to the present invention is preferably added to other ingredients to prepare the finished product. For this purpose, the product P can be added as is, hence in powder form, or in liquid form, i.e. after being rehydrated. The product P according to the present invention is easily rehydrated and dispersed. Depending on the type and on the recipe of the finished product to be prepared, the product P is used as is or only after being rehydrated.

The liquid preparation is obtained with a process that comprises the stage of adding a suitable liquid to the product P in the amount desired to obtain a beverage with the desired organoleptic properties and density. To improve rehydration of the product P in said liquid, this stage involves mixing, which may also continue also subsequently to addition of the liquid to the product P. This process is typically performed at room temperature. Typically, said liquid to be added to the product P is water.

After the liquid, in particular water, has been added to said product P, a beverage substituting milk of animal origin and that can be used in its place is obtained.

To obtain this beverage, the amount by weight of water in which the product P is dispersed can vary greatly, according to requirements; therefore, the density of the beverage obtained also varies. Indicatively, this amount of water varies from 300 to 1000 g for 100 g product P in powder form.

As mentioned above, this product P, mainly intended for food industries and artisans, if necessary after being rehydrated and transformed into liquid, can be used as a base for producing, for example, ice cream, puddings, creams, bakery products, sauces, etc. Therefore, the present invention also relates to the finished food products, in liquid, cream or paste, or also solid, form (for example, milk substitute plant based beverages or ice cream, puddings, bakery products, creams and sauces) having as base, i.e., obtained from, said food product P as is or from said food product P after its rehydration.

According to the type of initial whole food of plant origin, the product P according to the present invention has its own color and flavor. The product P that is most versatile to use is that with a white or very light color and a delicate flavor; this product is typically the product based on sweet almonds.

The present invention further relates to a process for preparing the product P, which is, as mentioned above, a semi-finished product in dehydrated powder form.

Known transformation processes that allow a food to take dehydrated powder form have various stages including, in general, at least the dehydration of the whole food, which is performed, depending on the case, either on the food as is, if this is liquid (if necessary after having reduced it to concentrated form if required), or after grinding the food, if this food is in solid form.

The dehydration process influences the technological and nutritional properties of the dehydrated product and therefore the choice of the specific type of technological treatment is important to vary said properties in the finished product.

A specific process widely used in the food industry, as it produces a product with high technological and nutritional properties, is represented by the spray drying technique. Among other things, with this technique it is possible to obtain low density powders, which are therefore easily rehydrated and dispersed as required. Therefore, this technique is the one preferred also in the case of production of the product P according to the present invention.

Currently, in the food industry only foods in liquid form, i.e. having a high water content in their composition, are processed with the spray drying technique. Therefore, these foods are typically watery beverages, such as fruit juices, tea and coffee. Moreover, these liquid preparations may not have the same nutritional composition as the original food from which they derive, as previously indicated in relation to difference in nutritional properties between almond milk and almonds.

In the spray drying process used to produce the product P according to the present invention, the initial compound generally has the consistency of a paste, rather than being a fluid preparation such as those mentioned above.

In fact, after grinding, necessary to subsequently subject the ground product to the spray drying process, of the aforesaid foods, in particular oleaginous fruit, a preparation with a paste/viscous consistency, due to the high lipid content typical of said foods, is obtained. This preparation can be subjected as is to the spray drying process, which is performed according to known techniques.

To obtain the product P with the properties and the advantages mentioned above, in this process said paste/viscous preparation as obtained from the grinding stage is mixed with an aforesaid vegetable bulking agent.

In short, the product P according to the present invention is typically prepared by means of a process T that comprises, as essential stages, grinding of the aforesaid oleaginous fruit, preferably until the oleaginous fruit is reduced to paste (or cream) form, and subsequently mixing it with the vegetable bulking agent to obtain a mixture M, which is subsequently subjected to a dehydration stage to obtain a dehydrated fine powder.

In particular, the production process T of the product P starts with a stage Si in which said oleaginous fruit, shelled and if necessary also with the cuticle removed, in raw or roasted form, is reduced to paste or cream form. This stage Si can be performed according to known methods. Naturally, this process T can make use of paste, or cream, of oleaginous fruit, such as almond or pistachio paste, prepared previously and possibly commercially available.

In general, said stage Si to prepare said paste, or cream, of oleaginous fruit comprises the step of:
  grinding, and if necessary refining, the oleaginous fruit to obtain a paste, or cream. The grinding step is performed, for example, in a ball mill, which can also produce a homogenization effect on the paste and, if necessary, the paste obtained is further homogenized.

This step, or these steps, if necessary can be preceded by a step of roasting the oleaginous fruit, shelled and if necessary with the cuticle removed, and subsequent cooling, generally to room temperature, of the roasted oleaginous fruit.

Roasting is generally performed at a temperature of between 80 and 100° C. and for a period of time between 2 and 15 minutes.

More in particular, said process T comprises the following stages, which follow one another in the order listed:
  I) preparation of a mixture M by means of mixing at least the following components:
    a food of plant origin (I) obtained from the aforesaid oleaginous fruits and mixtures thereof, said food of plant origin (I) being in ground form, preferably to obtain the paste or cream form, and
    a vegetable bulking agent, generally and preferably in powder form; said two components being mixed in a ratio (by weight) varying from 1:1, preferably from 1:1.2, to 1:7;
  II) subjecting the mixture M prepared in the preceding stage to nebulization/atomization;
  III) obtaining a product in powder form by means of dehydration of the product obtained in the preceding stage.

As stated, the paste or cream (I) obtained by grinding said fruits is used to produce said mixture M. The oleaginous fruit used to produce said the food of plant origin (I), i.e., said paste or cream, can be in one of the following forms:
  raw, if necessary dehydrated (or dried), for example using ventilation, typically only to reduce the moisture; or
  roasted.

These dehydration and roasting processes are known per se and therefore shall not be further described.

In this process, the food used in stage (I) is in paste or cream form, obtainable in this form according to processes well known to those skilled in the art, one of which will be described only briefly below.

As mentioned previously, said paste or cream of said oleaginous fruit does not contain substances that are not present in the oleaginous fruit with which this paste or cream is produced.

The mixture M produced in the stage (I) is prepared using a common mixer. Typically, mixing is performed at a temperature generally of between 10 and 50° C., typically at room temperature. It is preferable for the temperature in this stage not to be too high, to avoid altering the food. For this purpose, mixing can be performed at constant speed. This stage (I) is prolonged for the time required to obtain the desired homogeneous mixture. After preparing this mixture M, comprising at least said food of plant origin (I) and said vegetable bulking agent, it is sent to the processing stage in which the mixture M is subjected to dehydration, preferably using the spray drying technique.

The spray drying technique for dehydrating the mixture is preferred as it allows, as stated above, a dehydrated product of high quality to be obtained, even after short drying times, i.e., exposing the food to heat for a short period of time, which reduces the deterioration and/or alteration of the food caused by heat.

According to an embodiment, in short, the mixture M is first subjected to nebulization/atomization in a rotary atomizer to form droplets, and then everything is placed in a dehydration chamber.

After these droplets have formed, they are washed by a counterflow of hot air supplied at a temperature ranging from 165 to 200° C.

From the dehydration chamber, everything is transferred to a cyclone, where the dehydrated powder is separated from the gas.

The dehydrated powder thus obtained is then discharged from the cyclone and collected, then usually sieved to obtain a more homogeneous fine powder, and finally packaged. Sieving is performed with sieves preferably having mesh sizes suitable for obtaining the product P with the above-mentioned grain size.

An example of the present invention is provided below purely for non limiting illustrative purposes.

DESCRIPTION OF THE PREFERRED EMBODIMENTS

Example 1

Preparation of the mixture M based on sweet almonds A mixture M is prepared using an almond paste containing only sweet almonds of the Tuono variety from Val di Noto; this paste is produced by the company Di Bartolo S.r.l. Said paste has the following properties:
lipid content of 55.3% by weight,
moisture content of 1.60%.

Said mixture M is prepared starting from (parts by weight):
parts of said sweet almond paste, and
75 parts of maltodextrins in white powder form.
The maltodextrins used have the following properties:
dextrose equivalent content of between 18 and 20,
apparent density (poured bulk density) of around 500 g/l,
particle size: larger than 250 μm in an amount no greater than 10%, and smaller than 40 μm in an amount below 50%.

This mixture is produced in a mixer. The mixing process is performed at a temperature of 25° C., mixing at constant speed.

This mixture is in paste form, having a viscosity of below 200 cps. The mixture has a pH of between 5 and 6.

Spray-Drying Process

Subsequently, this mixture M is subjected to a spray drying process, i.e., it is first atomized in a rotary atomizer and then dehydrated in a dehydration chamber.

The droplets thus formed are washed by a counterflow of hot air at a temperature ranging from 175° to 185° C.

At the end of the process, dehydrated fine powder having a grain size ranging from 140 to 180 μm is formed.

The product P obtained is a powder, having a moisture content of 4.68%.

This powder is white in color and has a very delicate flavor.

Said fine powder thus obtained is rehydrated in proportions of 100 grams of powder with 500 grams of water, following mixing at room temperature, with the formation of a milky liquid.

The production of both ice cream and of puddings took place without difficulty using this milky liquid formed with the product P thus obtained in place of cow's milk, as did the production of bakery products directly using the product P in powder form.

Organoleptic test: end products in the form of a cream and bakery products were tasted by a panel of tasters, who did not detect any unpleasant odors and flavors.

The invention claimed is:

1. A food product P in powder form, said product P having a moisture content equal to or lower than 10% by weight, said product P consisting of the following components:
   (a) a vegetable food (a) selected from cashew nuts, peanuts, almonds, hazelnuts, pine nuts, pistachios, walnuts or a mixture thereof,
   (b) a vegetable bulking agent, which is at least 70% by weight water-soluble, said vegetable bulking agent being selected from starches and starch derivatives; and
   (c) a further component in an amount from 0 to 10% by weight with respect to a total weight of the food product P, said further component is other than said components (a) and (b),
said components (a) and (b) being in a ratio (by weight) varying from 1:1 to 1:7.

2. The product P according to claim 1, wherein the components (a) and (b) are present in the following amounts (percentages by weight):
from 13 to 45% of component (a), and
from 55 to 87% of component (b).

3. The product P according to claim 1, wherein the component (b) is a maltodextrin.

4. The product P according to claim 3, wherein the almonds are sweet or bitter almonds or a mixture thereof.

5. The product P according to claim 1 having a lipid content of between 2.5 and 20% by weight.

6. The product P according to claim 1, having a grain size of the powder of between 80 and 250 μm.

7. The product of claim 1, wherein the components (a) and (b) are in the ratio (by weight) varying from 1:1.2 to 1:7.

* * * * *